US006635975B2

(12) United States Patent
Hsieh et al.

(10) Patent No.: US 6,635,975 B2
(45) Date of Patent: Oct. 21, 2003

(54) ELECTRIC DISCHARGING PERSONAL SAFETY DEVICE

(75) Inventors: Tien-Di Hsieh, Taipei (TW); Han-Liang Chen, Taipei (TW)

(73) Assignee: Motedo Co., Ltd., Taipei (TW)

( * ) Notice: Subject to any disclaimer, the term of this patent is extended or adjusted under 35 U.S.C. 154(b) by 143 days.

(21) Appl. No.: 09/908,116

(22) Filed: Jul. 17, 2001

(65) Prior Publication Data

US 2002/0041479 A1 Apr. 11, 2002

(30) Foreign Application Priority Data

Oct. 6, 2000 (TW) ..................................... 89217360 U

(51) Int. Cl.[7] ................................................ H02H 1/04

(52) U.S. Cl. ...................................... 307/326; 361/232

(58) Field of Search .......................... 307/326; 361/232

(56) References Cited

U.S. PATENT DOCUMENTS 5,467,247 A * 11/1995 De Anda et al. ............ 361/232

* cited by examiner

*Primary Examiner*—Brian Sircus
*Assistant Examiner*—Robert L. DeBeradinis
(74) *Attorney, Agent, or Firm*—Kolisch Hartwell, P.C.

(57) ABSTRACT

An electric discharging personal safety device includes a main body and a plurality of spaced electrodes covered with respective coverings. Each of the coverings has a plurality of holes defined therein for discharge of electricity therethrough, and is colored to match the main body whereby the personal safety device is disguised to prevent an attacker being forewarned of the punishment available from the device.

7 Claims, 7 Drawing Sheets

ELECTRIC DISCHARGING PERSONAL SAFETY DEVICE

BACKGROUND OF THE INVENTION

1. Field of the Invention

The present invention relates to an electric discharging personal safety device and, more particularly, to an electric discharging device is disguised as a conventional apparatus.

2. Description of Related Art

It is well known that an electric discharging personal safety device is an efficient tool for self protection, especially for a female confronting violence or unwanted attention etc. As shown in FIG. 7, such an electric discharging device includes a main body (50) with a pair of exposed electrodes (52) for discharging high voltage electricity.

However, the electrodes (52) are made of metal, e.g. stainless steel, and the luster of the metal electrodes (52) will enable an assailant to notice such tool and thus to dodge from the counterstrike defense. It is an objective of the invention to provide an electric discharging personal safety device to eradicate the aforementioned problem.

SUMMARY OF THE INVENTION

The objective of the present invention is to provide an electric discharging personal safety device disguised as a conventional apparatus.

Other objectives, advantages and features of the invention will be explained from the following detailed description when taken in conjunction with the drawings.

DETAILED DESCRIPTION OF THE PREFERRED EMBODIMENT

Figure 1:
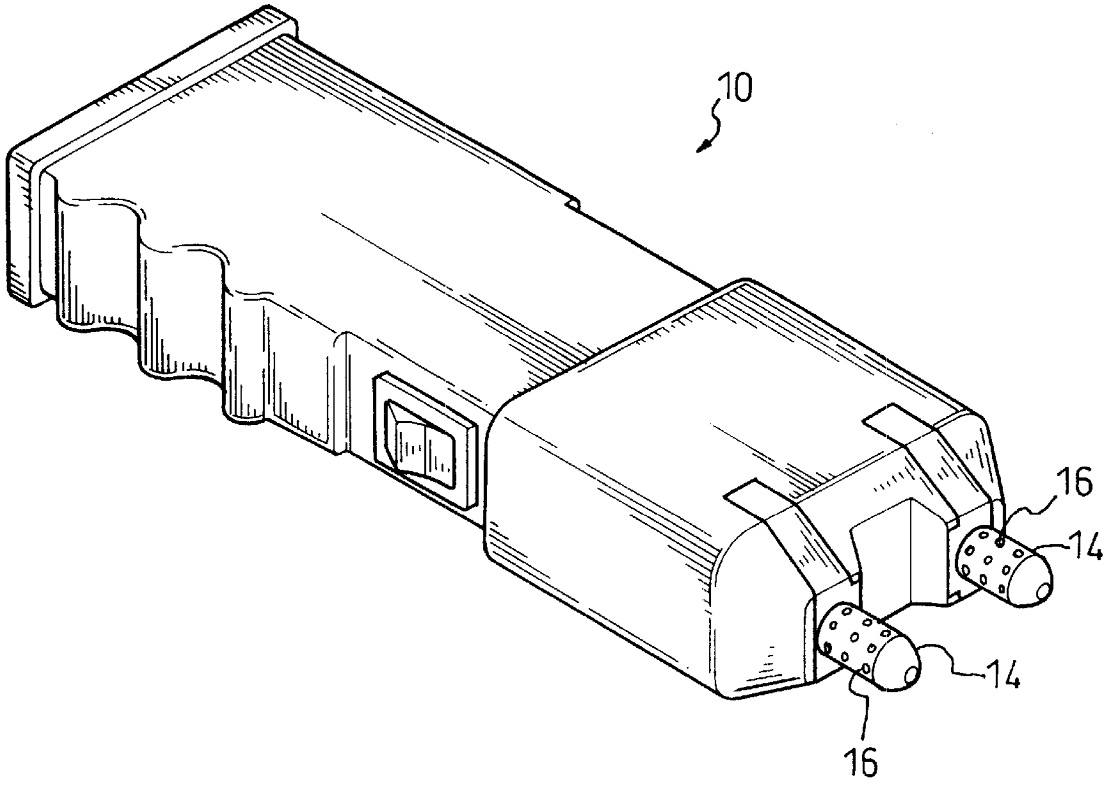
FIG. 1 is a perspective view of a first embodiment of an electric discharging personal safety device in accordance with the present invention.
Figure 2:
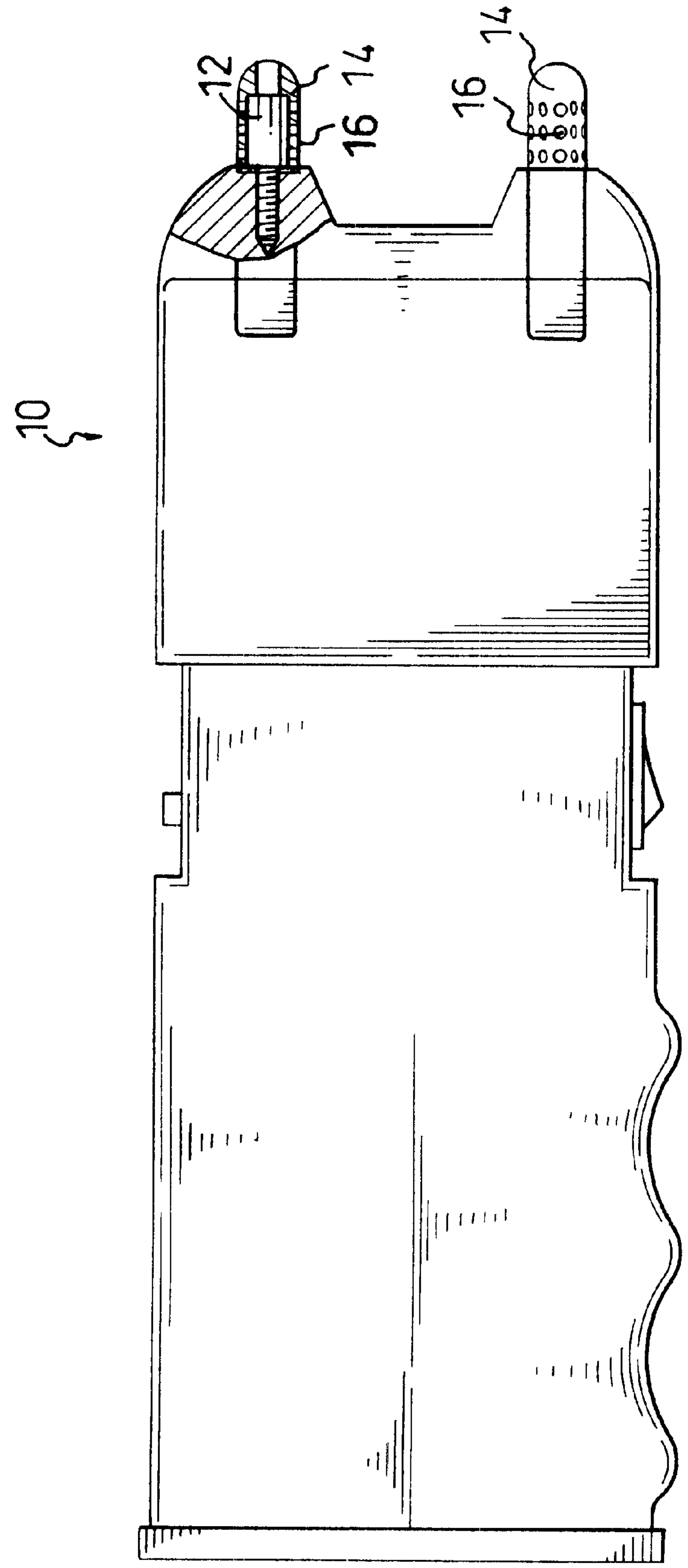
FIG. 2 is a front view, partially cut away, of the embodiment of the electric discharging device shown in FIG. 1.

Referring to FIGS. 1 and 2, a first preferred embodiment of an electric discharging personal safety device in accordance with the present invention includes a main body (10) configured into a handy body, with a pair of spaced electrodes (12) extending from an end thereof.

In the preferred embodiment, the electrodes (12) are both shaped into cylindrical pins and covered with respective coverings (14) that each has a plurality of holes (16) defined therein for discharge of electricity therethrough. Preferably, the coverings (14) are colored to match the main body (12) so as to cover up the luster of the metal from which the electrodes (12) are made.

Figure 3:
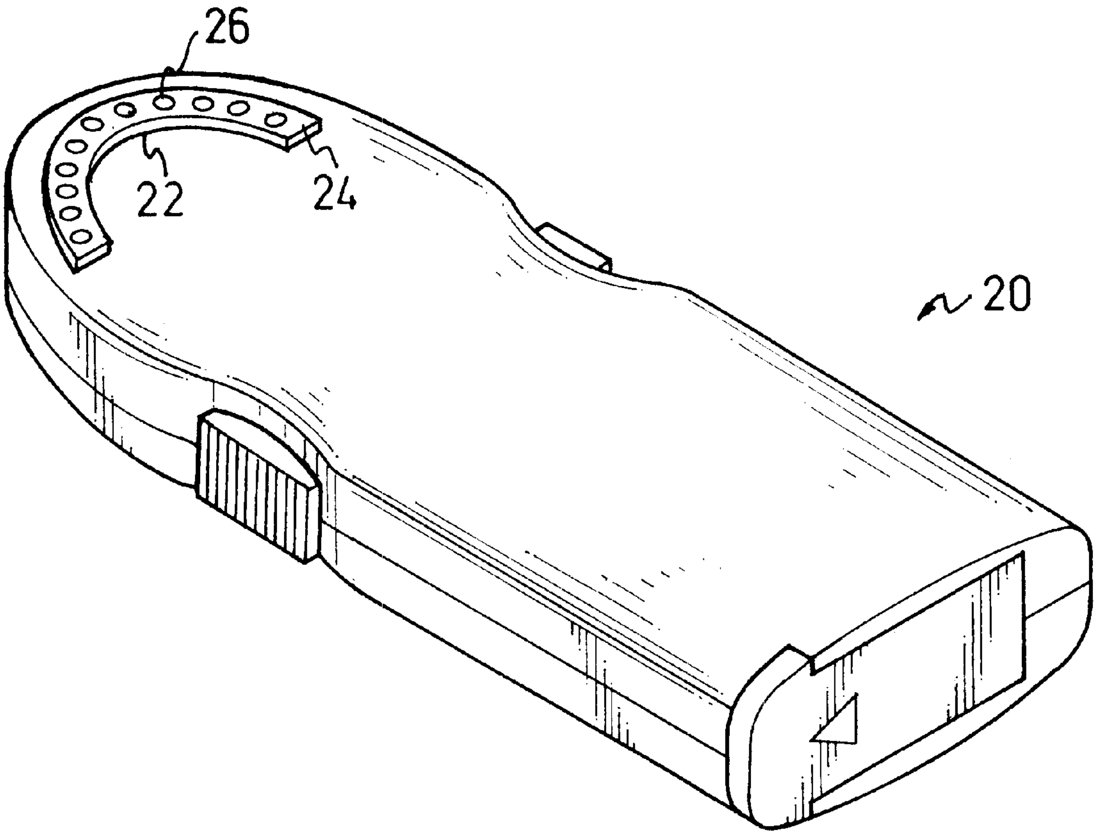
FIG. 3 is a perspective view of a second embodiment of the electric discharging device in accordance with the present invention.

Referring to FIG. 3, there is shown a second preferred embodiment of the electric discharging device in accordance with the present invention. In this embodiment, the electric discharging device includes a main body (20) configured as a handy body, but with a pair of spaced electrodes (22) that are shaped into arched plates and fixed on opposite sides of the main body (20). The electrodes (22) are both encased in a covering (24) which defines a plurality of holes (26) for discharge of electricity therethrough.

Although the electrodes (22) are illustrated, it is conceivable that a pair of additional electrodes shaped into cylindrical shape may extend from an end of the main body (20), as in the first embodiment. More preferably, each of the additional electrodes may be formed with secondary holes for the same purpose of electrical discharge therethrough.

Figure 4:
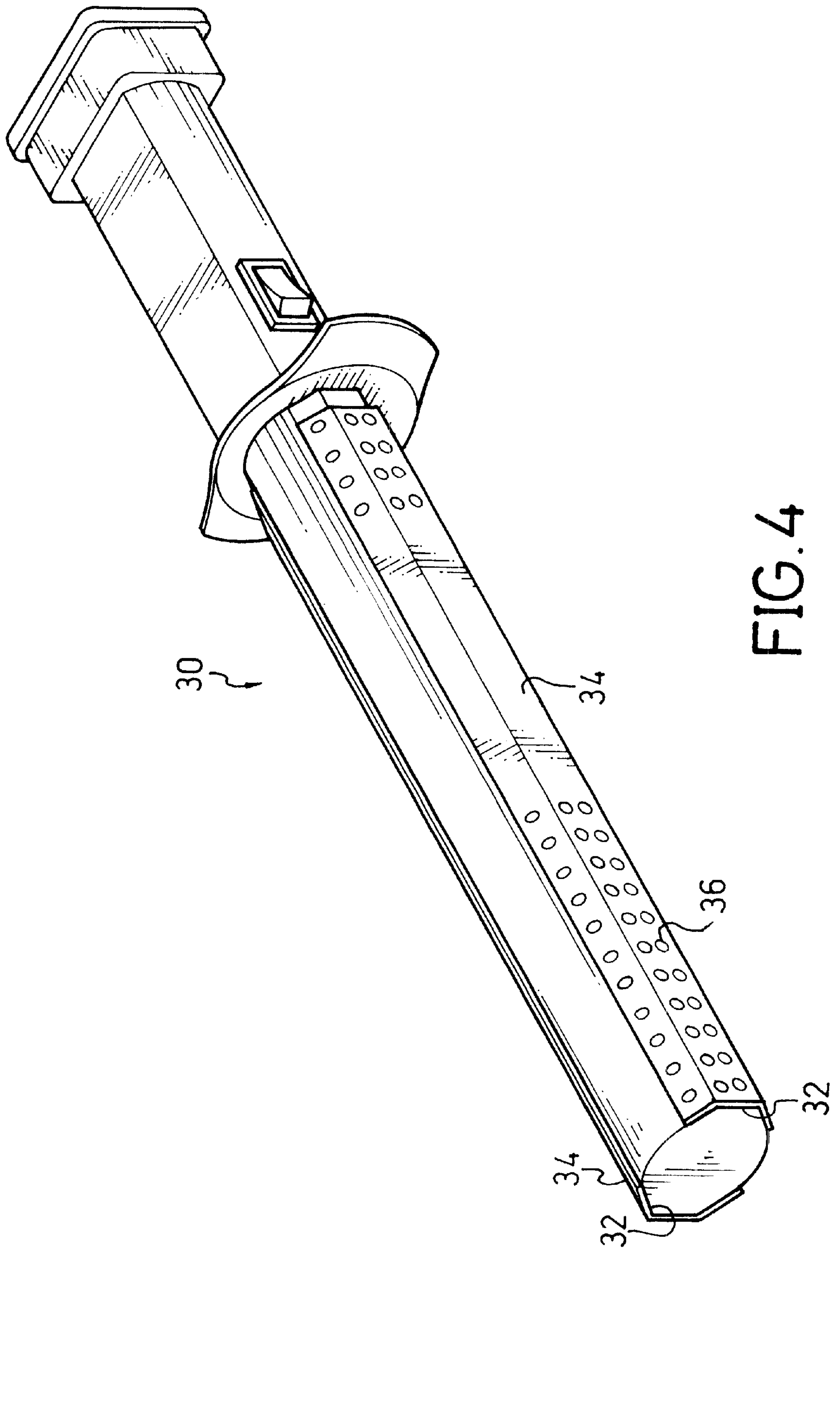
FIG. 4 is a perspective view of a third embodiment of the electric discharging device in accordance with the present invention.

Referring to FIG. 4, a third embodiment of the electric discharging device in accordance with the present invention is shown. The electric discharging device here includes a main body (30) configured as a baton, with a pair of spaced electrodes (32) fixed in parallel on opposite sides of the body (30). These electrodes (32) are shaped into sheets and covered with respective coverings (34), each having a plurality of holes (36) defined therein for electrical discharge therethrough.

Figure 5:
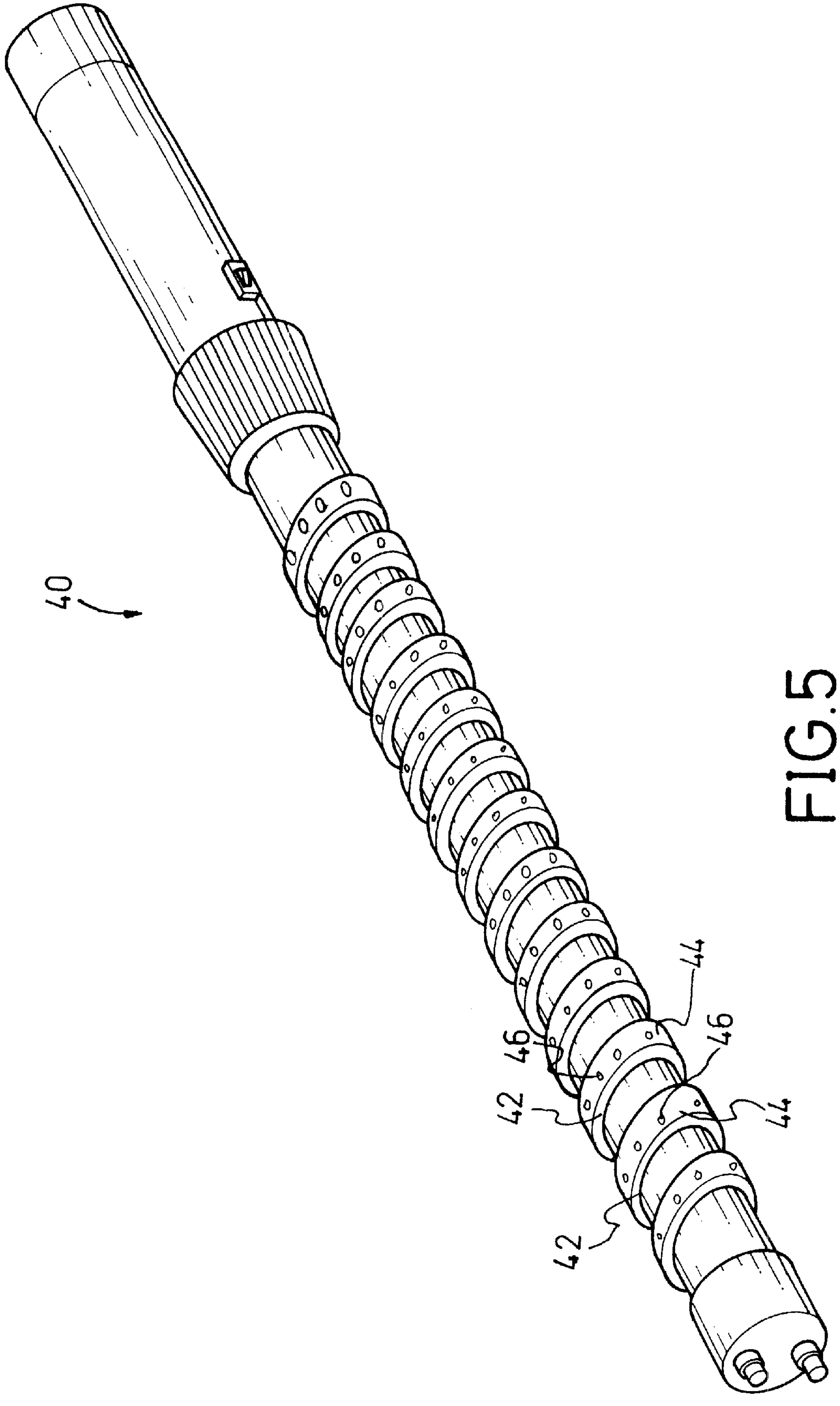
FIG. 5 is a perspective view of a fourth embodiment of the electric discharging device in accordance with the present invention.

Referring to FIG. 5, it is the fourth embodiment of the electric discharging device in accordance with the present invention. This electric discharging device includes a main body (40) configured as a baton, with a pair of spaced electrodes (42) fixed helically around the body (40). The electrodes (42) are shaped into strips and covered with respective coverings (44), each of which has a plurality of holes (46) for electrical discharge therethrough.

Figure 6:
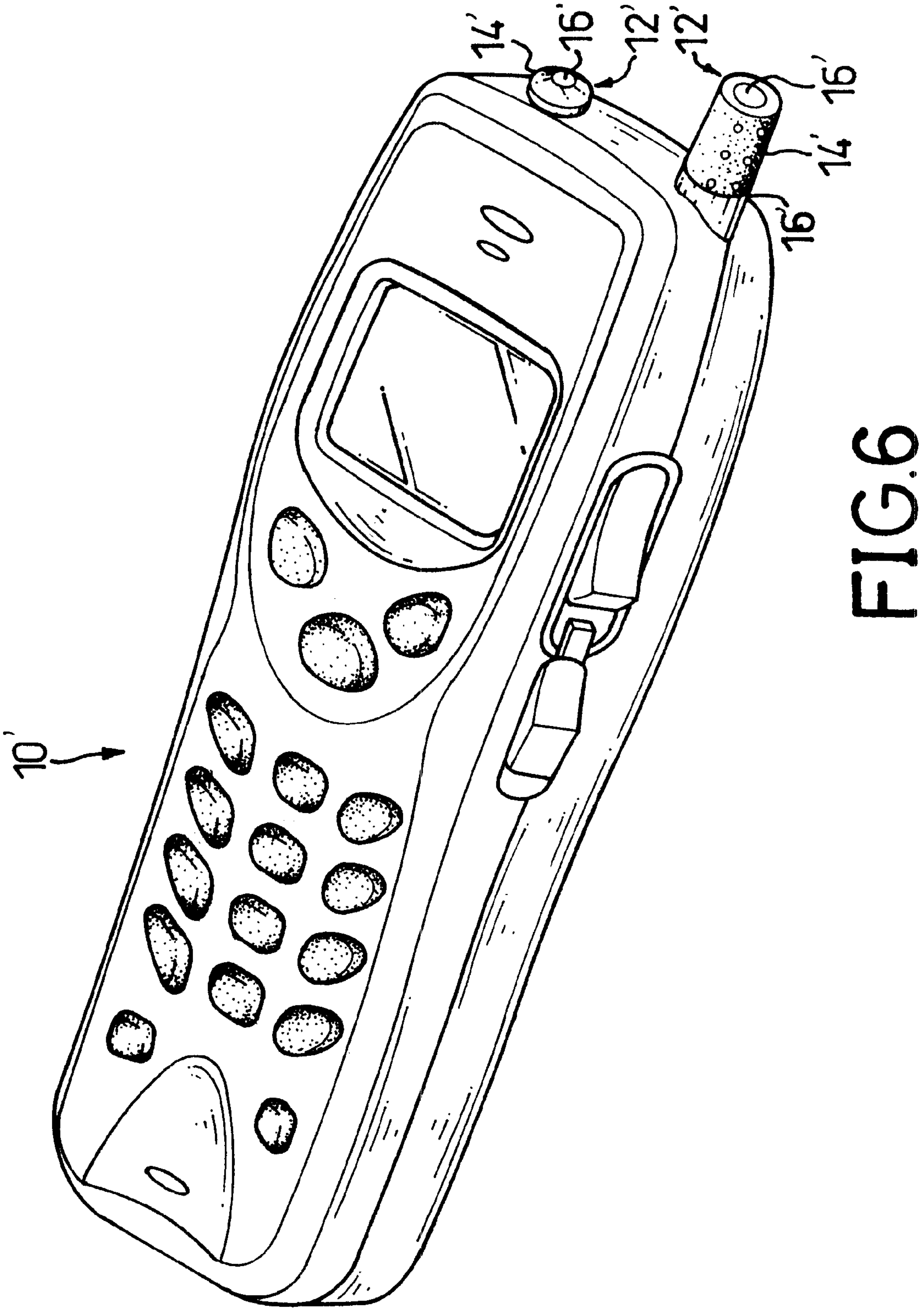
FIG. 6 is a perspective view of a fifth embodiment of the electric discharging device in accordance with the present invention.
Figure 7:
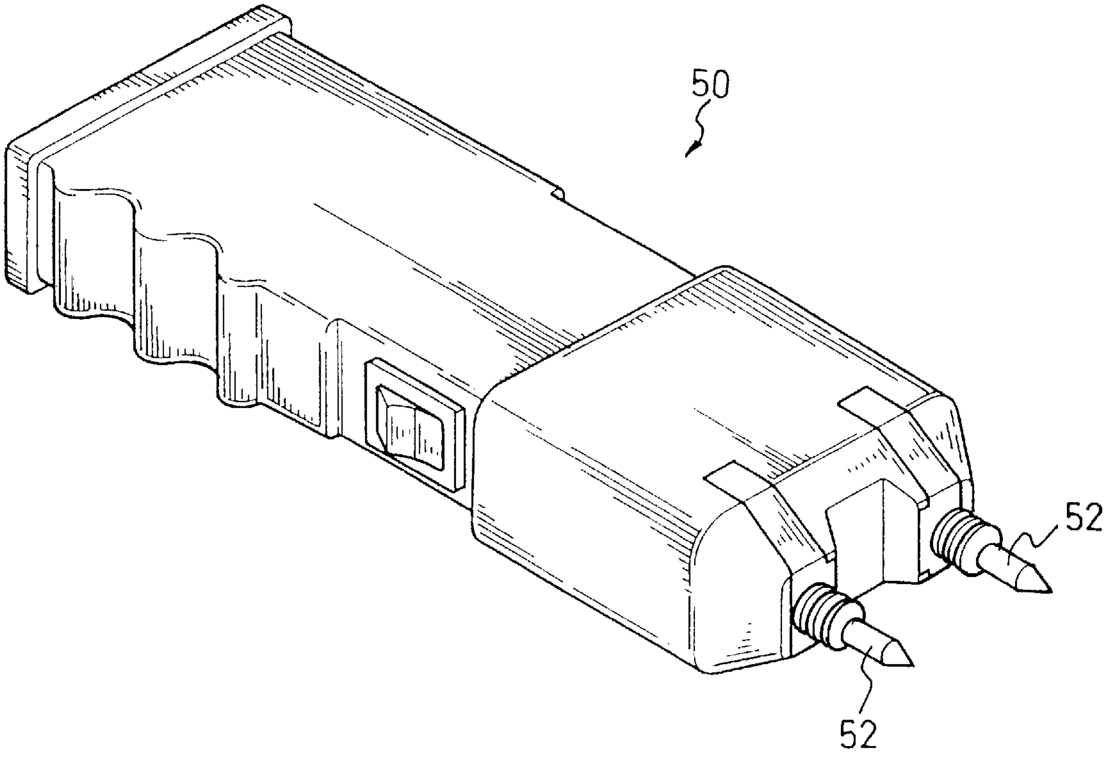
FIG.7 PRIOR ART
FIG. 7 is a perspective view of an electric discharging personal safety device of a conventional type.

Referring to FIG. 6, the fifth embodiment of the electric discharging device in accordance with the present invention is shown. This fifth embodiment includes a main body (10') configured as a mobile phone, with two spaced electrodes (12'), one being longer than the other, and both electrodes (12') extending from an end of the body (10').

Similar to a real mobile phone, the longer electrode (12') is shaped and disguised as an antenna but encased with a respective covering (14') that has a plurality of holes (16') for electrical discharge.

From the above description, it is noted that the invention has the benefit of providing the user with an element of counterstriking advantages against an assailant before the assailant discovers the defensive ability of the user. This is because the coverings (14, 24, 34, 44, 14') may be colored to match the main body (12, 22, 32, 42, 12') as a disguise whereby any assailant will overlook the defensive power that the user has.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. In an electric discharging personal safety device of the type having a main body with a plurality of spaced electrodes extending out from one end face of the main body, the improvement comprising a plurality of coverings wrapped around said electrodes respectively, and each of said coverings having holes defined therein for discharge of electricity therethrough, wherein said covering are colored to match said main body, and wherein said main body is configured as a handy body and said pair of spaced electrodes extends from the end face of said main body.

2. The electric discharging personal safety device as claimed in claim 1, wherein said pair of spaced electrodes are shaped into cylindrical pins that extend from an end of said main body.

3. The electric discharging personal safety device as claimed in claim 1, wherein said pair of spaced electrodes are shaped into arched plates and fixed on opposite sides of said main body.

4. The electric discharging personal safety device as claimed in claim 3, wherein a pair of additional electrodes shaped into cylindrical pins extends from an end of said main body, and wherein each of said additional electrodes is formed with secondary holes for discharge of electricity therethrough.

5. The electric discharging personal safety device as claimed in claim 1, wherein said main body is configured as a baton with a pair of spaced electrodes, and wherein said pair of spaced electrodes are shaped into sheets and fixed in parallel on opposite sides of said main body.

6. The electric discharging personal safety device as claimed in claim 1, wherein said main body is configured as a baton with a pair of spaced electrodes, and wherein said pair of spaced electrodes are shaped into strips and fixed helically around said main body.

7. The electric discharging personal safety device as claimed in claim 1, wherein said main body is configured and disguised as a mobile phone with two spaced electrodes, and wherein said spaced electrodes are shaped and disguised as antennas and extend from an end of said main body.

* * * * *